2,872,425

PROCESS OF PREPARING UREA-FORMALDE-
HYDE MOLDING COMPOSITION

Alfred R. Paz, Bound Brook, N. J., assignor to American Cyanamid Company, New York, N. Y., a corporation of Maine No Drawing. Application April 15, 1955
Serial No. 501,743

4 Claims. (Cl. 260—17.3)

This invention relates to thermosetting resinous compositions. More particularly, this invention relates to novel thermosetting urea-formaldehyde molding compositions which may be cured under heat or under heat and pressure to an infusible and insoluble state. Further, this invention relates to the novel resinous compositions, their method of production and articles produced therefrom.

Urea-formaldehyde reaction products have long been employed for the production of thermosetting resinous compositions. Articles molded from such resinous compositions are usually cured under heat or heat and pressure to the infusible and insoluble state. The so-called general purpose urea-formeldehyde resinous molding compositions are satisfactory for the production of conventional articles such as tableware and the like. However, certain of the urea-formaldehyde reaction products now available are not satisfactory when employed to mold large pieces, such as housings for radio and television cabinets, toilet seats and the like. Inasmuch as the molds for such housings are necessarily large and possess intricate shapes, excessive flow lines, gas marks and lack of surface gloss are apparent on the molded piece. We have now found that, by combining features of both compositions and processing, a novel thermosetting urea-formoldehyde molding composition may be obtained that greatly overcomes these deficiencies.

It is therefore an object of our invention to prepare a novel thermosetting urea-formaldehyde molding composition. It is a further object of our invention to prepare a novel urea-formaldehyde resinous composition by the critical control of the compositions employed and the process used in said preparation. These and other objects of our invention will be discussed more fully hereinbelow.

The novel thermosetting urea-formaldehyde resinous molding compositions of this invention are prepared utilizing two separately prepared urea-formaldehyde resinous syrups. By combining the ingredients of the molding composition in a novel manner and in novel proportions, a molding composition is thus prepared that finds particular use in the preparation of large molded housings. Molded articles prepared from the resinous composition of our invention have negligible flow lines, are devoid of gas marks and possess an enhanced surface gloss.

The invention accordingly comprises thermosetting resinous molding compositions and their preparation by blending two different substantially unalkylated resin syrups. The first resin syrup is prepared by reacting urea and formaldehyde in mol ratios between 1:1 and 1:1.5, respectively, at an acidic pH and an elevated temperature until the free formaldehyde content drops to less than 6.7%. The second resin is produced by reacting urea and formaldehyde in mol ratios between 1:1 and 1:2.1, respectively, under reflux conditions, first at an alkaline pH until methylol ureas are formed and thereafter at an acidic pH until a viscosity of the order of 24 to 44 centipoises is obtained whereupon the syrup is made alkaline. Said syrups are blended in weight ratios between about 80:20 and about 60:40. Narrower aspects of the invention relate to the preferred filler and the preferred content of filler.

In order that those skilled in the art may more fully understand the inventive concept herein set forth, the following examples are given by way of illustration and not limitation unless otherwise noted in the appended claims. All parts are parts by weight.

RESIN A

A urea-formaldehyde rein syrup is prepared by buffering a mixture of 1 mol of urea and 1.33 mols of formaldehyde as formalin with triethylamine to a pH of 6.0–6.2. Formalin is a 37% aqueous solution of formaldehyde. In the preparation of Resin A the methanol content of the formalin is reduced to within the order of from about 1% to 3%.

The condensation reaction between the urea and formaldehyde at the acidic pH is then carried out at a temperature of 90° F. to 100° F. until the free formaldehyde content drops to 6.5% to 6.7%. The reaction is then stopped and the resin syrup then buffered with an additional amount of triethylamine.

RESIN B

A urea-formaldehyde resin syrup is prepared by reacting 1 mol of urea and 2 mols of formaldehyde as formalin, at an alkaline pH of 7.9–8.2 for about 30 minutes. The reaction mixture is then made acidic with formic acid to a pH of 5.1–5.4 and the reaction is continued under reflux conditions until a viscosity of 24–44 centipoises at the standard temperature of 25° C. is obtained. The pH of the reaction mixture is adjusted to 7.7–8.0 and the resin syrup then cooled.

Formalin, commonly used in the preparation of urea-formaldehyde reaction products, is a 37% aqueous solution of formaldehyde. Normally, formalin contains from about 1% to about 7% methanol. We have found that the methanol content of the formaldehyde should preferably not exceed about 3% in order to assure obtaining final molding composition of desired properties.

In the preparation of Resin A the mol ratio of urea to formaldehyde may be within the order of from 1:1 to 1:1.5, respectively. The reaction is carried out under acidic conditions and at an elevated temperature until the proper degree of condensation, as determined by the free formaldehyde content in the aqueous solution, is obtained. As is well known, free formaldehyde can be measured by adding sodium bisulfite to samples of the reaction mixtures and titrating for the amount of sodium hydroxide produced. The reaction temperature should not be higher than about 212° F. in order that the condensation reaction may be easily controlled. Preferably, the reaction is carried out at a temperature in the order of 90° F. to 100° F.

In the preparation of the urea-formaldehyde resin syrup designated as B, initial reaction is carried out at an alkaline pH and under reflux conditions until methylol ureas are formed. At reflux conditions the methylol ureas are usually formed in a period of about 30 minutes. However, longer periods of time may be required in certain instances. After the methylol ureas are formed, the reaction mixture is made acidic and the reaction then continued under reflux conditions until a viscosity of about 24–44, preferably 38–44, centipoises is obtained. The pH of the first stage of the reaction is preferably about 7.9–8.2 and in the second stage preferably about 5.1–5.4. After the required viscosity is obtained, the pH of the resin syrup is again adjusted to the alkaline side, preferably in the order of 7.7–8.0, and the resin syrup then cooled.

The resinous molding composition is prepared by combining the resin syrups prepared above with a filler. The resin syrup types designated as Resin A and Resin B hereinabove may be blended in proportions, based on resin solids, ranging from 80 to 60 parts of Resin A and correspondingly from 20 to 40 parts of Resin B. Preparations of typical molding compositions are set forth in the example below.

*Example 1*

80 parts of Resin A are blended with 20 parts of Resin B. 122 parts of this blend of the resin syrups is then used to impregnate 29 parts of alpha-cellulose pulp. The resin impregnated filler is dried to a volatile content of less than 6.5% and then ball milled. During the milling of the dried material, 0.3% tetrachlorophthalic anhydride, 0.26% hexamethylenetetramine, and 0.48% zinc stearate are added. The homogeneously blended milled powder is then granulated and cut to the desired particle size for the production of the final molding composition.

The following table sets forth the physical properties of molded radio cabinet housings prepared from the molding compositions prepared in Example 1 when compared with a standard urea-formaldehyde resinous molding composition. The housing of Example 1 was prepared by molding at 300° F. for 3 minutes at 2500 p. s. i. in a straight close mold using a closing time of 10 seconds. The standard urea-formaldehyde resinous composition used for comparative purposes was prepared using 1.0 mol of urea and 1.3 mol of formaldehyde. This housing was cured at 300° F. for 3 minutes at 2500 p. s. i. in a straight close mold using a closing time of 12 seconds. The results are as follows:

TABLE 1

|  | Flow Lines | Gas | Surface Brightness |
| --- | --- | --- | --- |
| Example 1 | Good | None | OK |
| Comparative Example | Bad | Fair | OK |

Flow line rating:
 Good
 Fair
 Poor
 Bad

Gas rating:
 None—no gas
 Good—approximately 10%
 Fair—10–25%
 Poor—over 25%

In the preparation of the resinous molding composition, various types of cellulose are preferably employed. Thus, for example, cellulose materials which may be used are such as wood flour, paper pulp, alpha-cellulose, sawdust, walnut shell flour and the like. The amount of filler employed will depend upon the ultimate use of the molding composition and also upon the properties desired in the molded article. Thus, up to as much as about 80% by weight of the molding composition may be comprised of the filler. Preferably, however, the amount of the filler used should be within the order of about 15% to 25% by weight based on the total weight. While cellulosic fillers are preferably used, other fillers, such as asbestos, carbon black, diatomaceous earth, ground cork, sand and the like, may also be used.

Additives, as are well known in the art, may be added to the molding compositions at any point prior to the final cure of the composition. It is preferred, however, that the additives, particularly the latent curing catalyst, and the mold lubricant, be added to the filled resinous composition during the milling operation as set forth in Example 1. Dyes, pigments, mold lubricants and catalysts are among the additives that may be mentioned. Suitable catalysts that may be introduced into the reaction mixture are such as phthalic anhydride, ammonium chloride, ammonium silicofluoride, ammonium borofluoride, etc. While the desired property of the molding composition will dictate the amount of catalyst introduced into the material, we have found that from about 0.01% to about 10% by weight of the catalyst will cover most eventualities. However, it is preferred that from about 1% to about 3% by weight of the catalyst be present in the resinous thermosetting composition. Suitable mold lubricants are such as zinc stearate, glycerol monostearate, ceresin, carnauba wax, montan wax, calcium stearate, zinc palmitate, etc. The lubricant as its name implies is present in the molding composition to facilitate the subsequent conversion into molded parts. From about 0.01% to about 5% by weight of the lubricant is generally a sufficient amount. The preferred amount of lubricant is from about 0.3% to about 2.0% by weight. By carefully selecting the colorants introduced into the mixture, a final product of any desired color may be obtained. Illustrative examples of colorants that may be introduced into the mixture are such as cadmium yellow, cadmium red, cadmium maroon, titanium dioxide, black iron oxide, chrome green, gold, silver, aluminum and copper. Suitable dyes are such as alizarine red, Prussian blue, auramin, naphthol and malachite green. The amount of the colorants, catalysts and mold lubricants that are introduced into the mixture are such that the desired properties of the molded objects are obtained. Thus, for example, where a fast-curing object is desired, it is apparent that a larger amount of catalyst will be introduced into the mixture. The amount of the colorant may also vary depending upon the depth and shades of color desired. When a dark rich color is desired, colorants in an amount up to about 20% by weight may be used. Generally from about 0.5% to about 15% by weight of the colorant may be used to give any color desired. Obviously, when a clear molding composition is desired, no colorant will be introduced into the reaction mixture. In certain instances, it may be desirable to add an additional amount of that resinous syrup identified as Resin B to the filled composition during the milling operation. When this addition is made, amount varying from about 1% to about 10%, preferably from 1% to 3%, may be introduced into the formation.

During the drying of the resin impregnated filler and prior to the comminution of the material, a continuous type drier is preferably employed. In order to insure optimum drying in the continuous drier, the temperature maintained therein should be within the order of from 100° F. to 215° F. dry bulb and from 80° F. to 140° F. wet bulb, respectively; preferably within the order of from 150° F. to 205° F., dry bulb and from 90° F. to 120° F. wet bulb, respectively. While the material removed from the continuous drier may contain as much as 15% by weight of volatiles, it is preferred that the volatile content of the material removed therefrom be not in excess of about 8% by weight.

In order to obtain the various pH conditions required during the preparation of the resin syrups herein employed, alkaline or acidic substances may be used as required. Examples of these materials which may be listed are such as ammonia, sodium hydroxide or carbonate, calcium hydroxide, methyl amine, dimethyl amine, triisopropyl amine, ethanol amines, etc., and mixtures of such alkaline substances. Inorganic or organic acids such as sulfuric acid, hydrochloric acid, phosphoric acid, acetic acid, formic acid, etc., or acid salts may be used.

While the above description has been limited to urea per se, it will be appreciated that the urea component of the molding composition may be, for instance, urea itself, thiourea, guanidine, aldehyde-reactable substituted ureas, thioureas, iminoureas such as methylurea, acetylurea, benzoylurea, phenylthiourea, allylurea, ethylideneurea and the like.

Aldehydes other than formaldehyde may also be employed in the preparation of the molding composition herein set forth and claimed. Accordingly, such aldehydes as acetaldehyde, butyraldehyde, acroleinaldehyde, crotonaldehyde, etc., mixtures thereof or mixtures with formaldehyde may be used. It is preferred, however, that formaldehyde or compounds engendering formaldehyde, such as paraformaldehyde, hexamethylenetetramine, etc., be utilized in the preparation of the molding composition.

The molding compositions of this invention may be cured to an infusible and insoluble state employing standard equipment and using methods well known in the art. Thus, the molding compositions may be molded from either cold or pre-warmed granules or preforms. Suitable molding temperatures that may be employed are from 260° F. to 350° F. and the pressure employed may vary from about 1000 p. s. i. to about 20,000 p. s. i. Various molding cycles may be employed, depending upon the particular mold utilized in curing the material.

I claim:

1. A process for preparing a thermosetting resinous molding composition that comprises blending (a) a substantially unalkylated aqueous urea-formaldehyde resin syrup prepared by reacting urea and formaldehyde in a mol ratio of from 1:1 to 1:1.5, respectively, at a pH of from 6.0 to 6.2 and at an elevated temperature until the free formaldehyde content drops to less than 6.7% and (b) a substantially unalkylated aqueous urea-formaldehyde resin syrup prepared by reacting urea and formaldehyde in a mol ratio of from 1:1 to 1:2.1, respectively at reflux conditions and at a pH of from 7.9 to 8.2 until methylol ureas are formed, thereafter adjusting the pH within the order of 5.1 and 5.4 and continuing the reaction at reflux conditions until a viscosity within the order of 24 to 44 centipoises is obtained and finally adjusting the pH to within the order of 7.7 to 8.0, in the order of 80:20 to 60:40 parts of (a) to parts of (b), impregnating from about 15 to 25 parts of a filler with from about 85 to 75 parts of said blend, drying said resin impregnated filler and comminuting the dried material.

2. A process for preparing a thermosetting resinous molding composition that comprises blending (a) a substantially unalkylated aqueous urea-formaldehyde resin syrup prepared by reacting urea and formaldehyde in a mol ratio of from 1:1 to 1:1.5, respectively, at a pH of from 6.0 to 6.2 and at an elevated temperature until the free formaldehyde content drops to less than 6.7% and (b) a substantially unalkylated aqueous urea-formaldehyde resin syrup prepared by reacting urea and formaldehyde in a mol ratio of from 1:1 to 1:2.1, respectively, at reflux conditions and at a pH of from 7.9 to 8.2 until methylol ureas are formed, thereafter adjusting the pH within the order of 5.1 and 5.4 and continuing the reaction at reflux conditions until a viscosity within the order of 24 to 44 centipoises is obtained and finally adjusting the pH to within the order of 7.7 to 8.0, in the order of 80:20 to 60:40 parts of (a) to parts of (b), impregnating from about 15 to 25 parts of an alpha-cellulose with from about 85 to 75 parts of said blend, drying said resin impregnated filler and comminuting the dried material.

3. A process for preparing a thermosetting resinous molding composition that comprises blending, on a solid resin basis, from 80 to 60 parts of (a) a substantially unalkylated aqueous urea-formaldehyde resin syrup prepared by reacting urea and formaldehyde in a mol ratio of from 1:1 to 1:1.5, respectively, at a pH of from 6.0 to 6.2, and at an elevated temperature until the free formaldehyde content drops to less than 6.7%, and correspondingly from 20 to 40 parts of (b) a substantially unalkylated aqueous urea-formaldehyde resin syrup prepared by reacting urea and formaldehyde in a mol ratio of from 1:1 to 1:2.1, respectively, at reflux conditions and a pH of from 7.9–8.2 until methylol ureas are formed, thereafter adjusting the pH within the order of 5.1 to 5.4, and continuing the reaction at reflux conditions until a viscosity within the order of 24 to 44 centipoises is obtained and finally adjusting the pH to 7.7 to 8.0, impregnating a filler with said blend, drying said resin-impregnated filler and comminuting the dried material.

4. A thermosetting resinous molding composition prepared in accordance with claim 3.

References Cited in the file of this patent

UNITED STATES PATENTS 2,447,621    Smidth _____ Aug. 24, 1948